United States Patent

[11] 3,566,989

[72] Inventor Peter H. Ellis
   Chula Vista, Calif.
[21] Appl. No. 881,204
[22] Filed Dec. 1, 1969
[45] Patented Mar. 2, 1971
[73] Assignee Rohr Corporation
   Chula Vista, Calif.

[54] SOUND SUPPRESSION NOZZLE STRUCTURE FOR FAN JET AIRCRAFT ENGINE
9 Claims, 3 Drawing Figs.
[52] U.S. Cl.................................................. 181/51,
   239/127.3, 239/265.17
[51] Int. Cl....................................................... F01n 1/00,
   B64d 33/06
[50] Field of Search........................................239/265.13,
   265.17, 127.3; 181/33.22, 33.221, 33.222, 51, 43

[56] References Cited
UNITED STATES PATENTS
2,940,252 6/1960 Reinhart....................... 239/265.13
2,997,845 8/1961 Oulianoff..................... 181/33(.221)
3,306,394 2/1967 Smith et al................... 181/33(.221)
3,333,772 8/1967 Bruner.......................... 239/265.13

Primary Examiner—Robert S. Ward, Jr.
Attorney—George E. Pearson

ABSTRACT: A turbofan jet aircraft engine has a fan air plenum chamber housing mounted coaxially of the engine and downstream of the engine exhaust duct, the downstream end of the housing having an opening therein to form a central fan air discharge nozzle. A plurality of circumferentially spaced fan air inlet tubes communicate the housing with the usual annular fan air duct surrounding the engine, and a plurality of short ducts, interposed in interdigitated relation between the fan air inlet tubes, discharge the remainder of the fan air into the main stream of primary exhaust gases closely adjacent the engine. A plurality of fan air nozzle tubes also radiate from the plenum chamber housing, and extend downstream to surround the central nozzle. A fluted tailpipe, coextensive with the outer wall of the annular fan air engine duct, surrounds the plenum chamber and all of the ducts and nozzles. A retractable ejector ring, preferably acoustically lined, is mounted for movement from retracted position surrounding the tailpipe to deployed position just downstream of the nozzle exit plane.

PATENTED MAR 2 1971  3,566,989

INVENTOR.
PETER H. ELLIS
BY
George E. Pearson
ATTORNEY

SOUND SUPPRESSION NOZZLE STRUCTURE FOR FAN JET AIRCRAFT ENGINE

BACKGROUND OF THE INVENTION

It is common knowledge within the aircraft industry that the suppression of jet aircraft noise is one of the important problems facing the industry. The almost complete replacement of piston type engines with jets in recent years, the constant and increasing trend toward larger and more powerful engines, increasing passenger and freight business, location of existing inadequate airports with their approach and takeoff flight paths extending over heavily populated areas, increased legislation against excess aircraft jet engine noise, and hostile court decisions all point to the urgency of the problem.

A major portion of the noise from a jet aircraft engine is produced by the shearing encounter of the hot, high velocity exhaust gases with the ambient atmosphere. It is well known that any reduction in the heat and velocity of the exhaust gases relative to the atmosphere at their shear zone reduces the noise generated in this zone. Prior attempts at reducing such relative heat and velocity have included the division of the primary exhaust gases into several individual streams, and the discharge of these individual streams either directly into the ambient atmosphere, or indirectly by premixing the exhaust gases with fan air before encountering the ambient atmosphere. Most of such prior attempts have either failed to provide proper ventilation for all of such streams, or have created an objectionable amount of back pressure with a resultant loss of thrust.

PURPOSE OF THE INVENTION

It is a primary objective of the invention to provide a noise reducing nozzle structure for the discharge end of a turbofan jet aircraft engine which will introduce part of the engine fan air into the exhaust gases of the engine while said gases are still within a fluted tailpipe, and will pass the remainder of the fan air through a plenum chamber housing and a plurality of nozzles mounted within the main stream of the exhaust gases in the tailpipe and will discharge said remainder of the fan air, in a plurality of small streams, into the main stream of exhaust gases as the latter emerge from the tailpipe.

BRIEF DESCRIPTION OF THE DRAWINGS

The foregoing objective and advantages of the invention will be apparent from the following description and the accompanying drawings, wherein.

DETAILED DESCRIPTION

Figure 1:
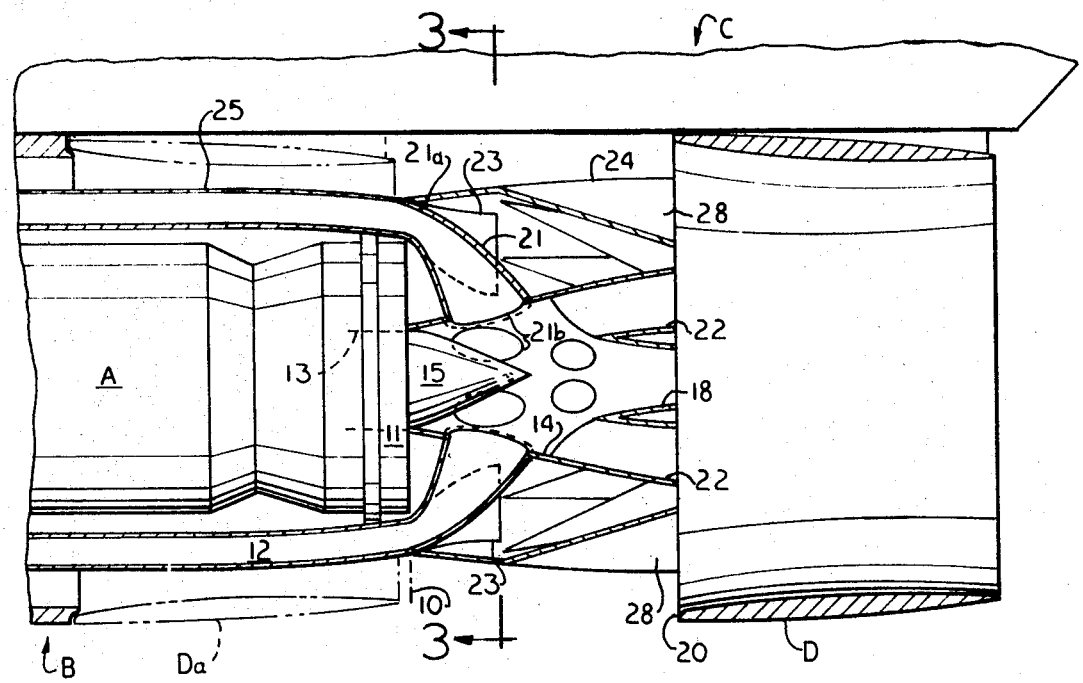
FIG. 1 is a longitudinal, sectional, partially diagrammatic, view of a turbofan jet aircraft engine taken along line 1-1 of FIG. 2, an air ejector ring being shown in deployed position in solid lines and in retracted position in broken lines.

Referring to the drawings in detail, a turbofan jet aircraft engine A is of conventional type upstream or to the left of a plane defined by the line 10 in FIG. 1, and is surrounded by a usual annular fan air duct 12.

A usual aft engine rotor support bearing housing 13 is provided in the downstream end of the engine exhaust duct 11, and the engine is mounted in a conventional nacelle B supported on the lower end of a pylon C depending from an airplane wing, not shown. Mounted coaxially on the rotor bearing support 13 is a plenum chamber housing 14, which is in the general form of a necked vase. The base of the housing 14 is closed, and is coincident with the bearing housing 13. A usual tail cone 15 extends coaxially into the housing 14. The downstream end of the housing 14 is of reduced diameter and is open to form a central fan air discharge nozzle 18. This central nozzle 18 defines a nozzle exit plane normal to the engine axis as indicated by the line 20 in FIG. 1.

Figure 2:
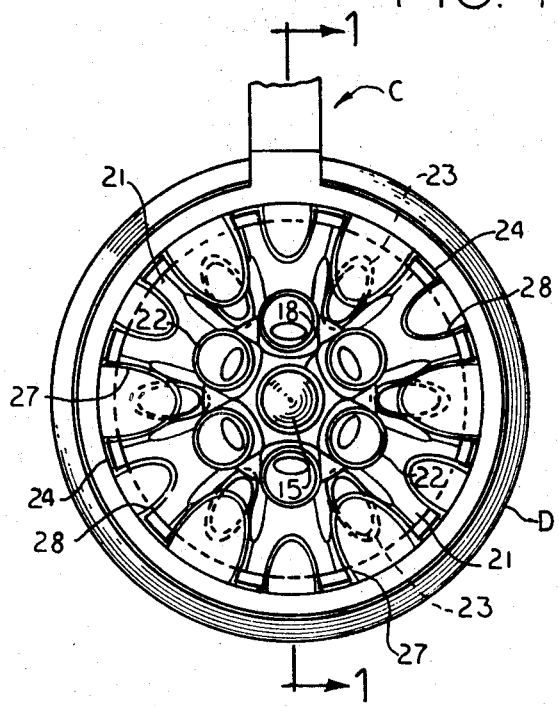
FIG. 2 is a rear, end, elevational view of the structure shown in FIG. 1.
Figure 3:
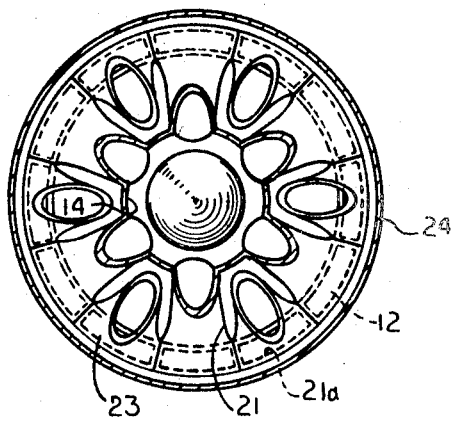
FIG. 3 is a sectional view taken along line 3-3 of FIG. 1.

For introducing fan air into the housing 14 a plurality of six fan air inlet tubes 21 have their upstream ends 21a of generally oblong, arcuately curved shape as shown in broken lines in FIG. 3, and are fitted in symmetrically spaced relation see FIG. 2, to the downstream end of the annular fan air duct 12. The upstream end 21a of each an air inlet tube has a circumferential extent of approximately 30°, or one-twelfth of the circumference of the fan air duct. The downstream ends 21b of the fan air inlet tubes 21 are fitted in sealed relation to the housing 14, and communicate openly with the interior thereof.

Six fan air nozzle tubes 22 are fitted in sealed relation to the housing 14 downstream of the air inlet tubes 21, and extend downstream to surround the central nozzle 18. The nozzle tubes 22 terminate on the nozzle exit plane 20 in a circular row about the central nozzle 18 as best shown in FIG. 2.

Also fitted into the after end of the annular fan air duct 12, in interdigitated relation between the fan air inlet tubes 21, are a similar plurality of short, fan air discharge ducts 23, which discharge jets of fan air from the annular fan air duct 12 directly into the hot primary exhaust gases from the engine exhaust duct 11. The short fan air ducts 23 are of substantially uniform cross-sectional area throughout their length, as are also the fan air inlet tubes 21.

A tail pipe 24 is mounted coextensively on the downstream end of the outer wall 25 of the annular fan air duct 12, and surrounds the housing 14, air inlet tubes 21, nozzles 18 and 22 and short ducts 23. This tailpipe 24 terminates substantially on the nozzle exit plane 20, and a plurality of six tapered flutings 27 are formed at symmetrically spaced intervals in the downstream terminal portion thereof. A similar plurality of smaller flutings 28 are also formed in the tailpipe 24, with the smaller flutings interposed medially between the larger ones.

While not essential to the present invention, it is preferred to provide a retractable ejector ring D which may be mounted as shown in U.S. Pat. application Ser. No. 834,281, filed May 15, 1968 and owned by the assignee of the present invention. The ejector ring is mounted coaxially of the engine A, to move from retracted position closely surrounding the after end of the engine nacelle B as shown in broken lines Da in FIG. 1, to deployed position just downstream of the nozzle exit plane 20 as shown in solid lines D in FIG. 1. The ejector ring preferably is acoustically lined and provided with thrust reverser doors, not shown, in a well-known manner. When the ejector ring D is provided, it is intended to be moved to its deployed, solid line position of FIG. 1 during takeoff and landing approach when maximum sound suppression is required, and to be retracted to its inoperative position Da of FIG. 1 at other times.

OPERATION

Assuming that the ejector ring D is in its retracted, broken line position Da of FIG. 1, and that the engine A is mounted on an airplane flying at cruising speed, the hot exhaust gases flowing through the engine exhaust duct 11 pass through the annular space between the housing 14 and the tailpipe 24, and between and around the fan air inlet tubes 21 and nozzle tubes 22. Within this space relatively cool fan air from the short ducts 23 is discharged into the exhaust gases, and heat is transferred from the hot exhaust gases through the walls of the housing 14, tubes 21 and nozzle tubes 22 to the fan air flowing through said housing and tubes. This heat transfer tends to cool and contract the primary exhaust gases, and to heat and expand the fan air, while the fan air from the short ducts 23 cools and adds to the volume of the exhaust gases and reduces their velocity.

Noise generated within the tailpipe 24 by the small streams of fan air issuing from the short ducts 23 into the exhaust gases is shielded by the tailpipe 24, and also by the ejector ring D when the latter is deployed.

As the primary exhaust gases, partially cooled by the addition of fan air from the short ducts 23, pass the nozzle exit plane 20, the remainder of the fan air issues in small streams from the nozzles 18 and 22 into the main stream of the exhaust gases, thereby adding its volume to that of the discharged gases and further cooling and slowing down said gases.

Additionally, as the main stream of exhaust gases is discharged from the downstream end of the tailpipe 24, ambient atmospheric air, flowing relatively downstream along the outside of the engine nacelle B and the tailpipe 24, is drawn into and along the tailpipe flutings 27, and 28 and into the periphery of the jet stream, thereby further assisting in the intermixing of the jet exhaust stream with the ambient atmosphere.

All of the foregoing factors tend to break up and aerate the main stream of primary exhaust gases and to reduce their temperature and velocity.

With the ejector ring D deployed to its operative solid line position of FIG. 1, in addition to its usual aspirating effect of pumping air into the jet stream of gases discharge from the downstream end of the engine, it speeds up the downstream flow of atmospheric air around the fluted after end of the tailpipe 24, thereby further aerating and reducing the relative shear velocity between the ambient atmosphere and the jet exhaust stream from the engine, and shields the ground beneath from some of the noise generated.

I claim:

1. A sound suppression nozzle structure for a turbofan jet aircraft engine having an axial exhaust duct and a fan air duct, with a rear rotor bearing support centered in the downstream end of said exhaust duct, said nozzle structure comprising:
   a plenum chamber housing mounted coaxially of the engine and downstream of the rotor bearing support, the downstream end of the housing being open and forming a central fan air exhaust nozzle;
   a plurality of fan air inlet tubes spaced apart in the downstream end of the fan air duct and communicating the fan air duct with the interior of the housing;
   a plurality of short fan air ducts opening from the fan air duct directly into exhaust gases from the engine exhaust duct and mounted in interdigitated relation between the fan air inlet tubes, said short ducts terminating upstream of the central fan air exhaust nozzle;
   a plurality of fan air nozzle tubes mounted on and sealed to said housing and in open communication with the interior thereof, said nozzle tubes extending downstream and surrounding the central nozzle; and
   a tail pipe mounted coextensively with the exterior of the downstream end of the engine fan air duct, said tailpipe enclosing said housing and said tubes and nozzles.

2. A sound suppression nozzle structure as claimed in claim 1 wherein the wall of the housing is a surface of revolution and the housing is secured coaxially to the rear rotor bearing support.

3. A sound suppression nozzle structure as claimed in claim 2 wherein the housing is in the form of a necked vase with the neck portion thereof directed downstream.

4. A sound suppression nozzle structure as claimed in claim 3 wherein the fan air inlet tubes have their downstream ends attached to, and opening into the housing near the base thereof.

5. A sound suppression nozzle structure as claimed in claim 3 wherein a conical base is provided in the housing and said base extends downstream coaxially within the housing with its apex directed downstream.

6. A sound suppression nozzle structure as claimed in claim 1 wherein the nozzle tubes terminate at their downstream ends in a circle around the central nozzle on a nozzle exit plane defined by the central nozzle.

7. A sound suppression nozzle structure as claimed in claim 6 wherein the tailpipe also terminates at its downstream end on the nozzle exit plane.

8. A sound suppression nozzle structure as claimed in claim 1 wherein a plurality of flutings are provided in the downstream terminal portion of the tailpipe for drawing streams of ambient atmospheric air into the periphery of the exhaust gases discharged from the tailpipe.

9. A sound suppression nozzle structure as claimed in claim 1 wherein an ejector ring is movably mounted coaxially of the engine for axial movement from a retracted position surrounding the fan air duct and upstream of the downstream end of the tailpipe, to a deployed position just downstream of the downstream end of the tailpipe.